July 15, 1930.   J. J. BERRIGAN ET AL   1,770,727
DRYING APPARATUS AND PROCESS OF DRYING
Filed May 9, 1928    4 Sheets-Sheet 1
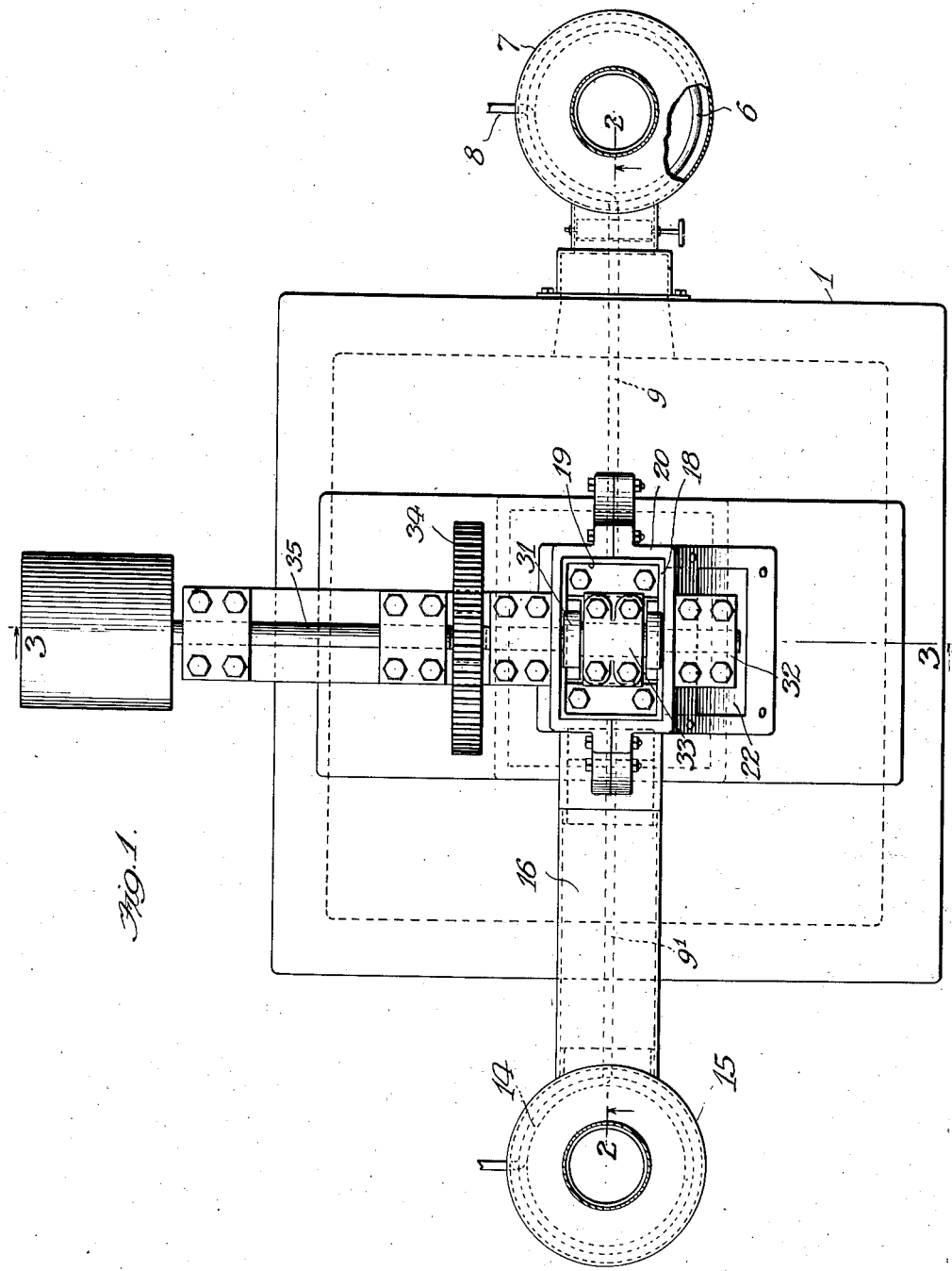

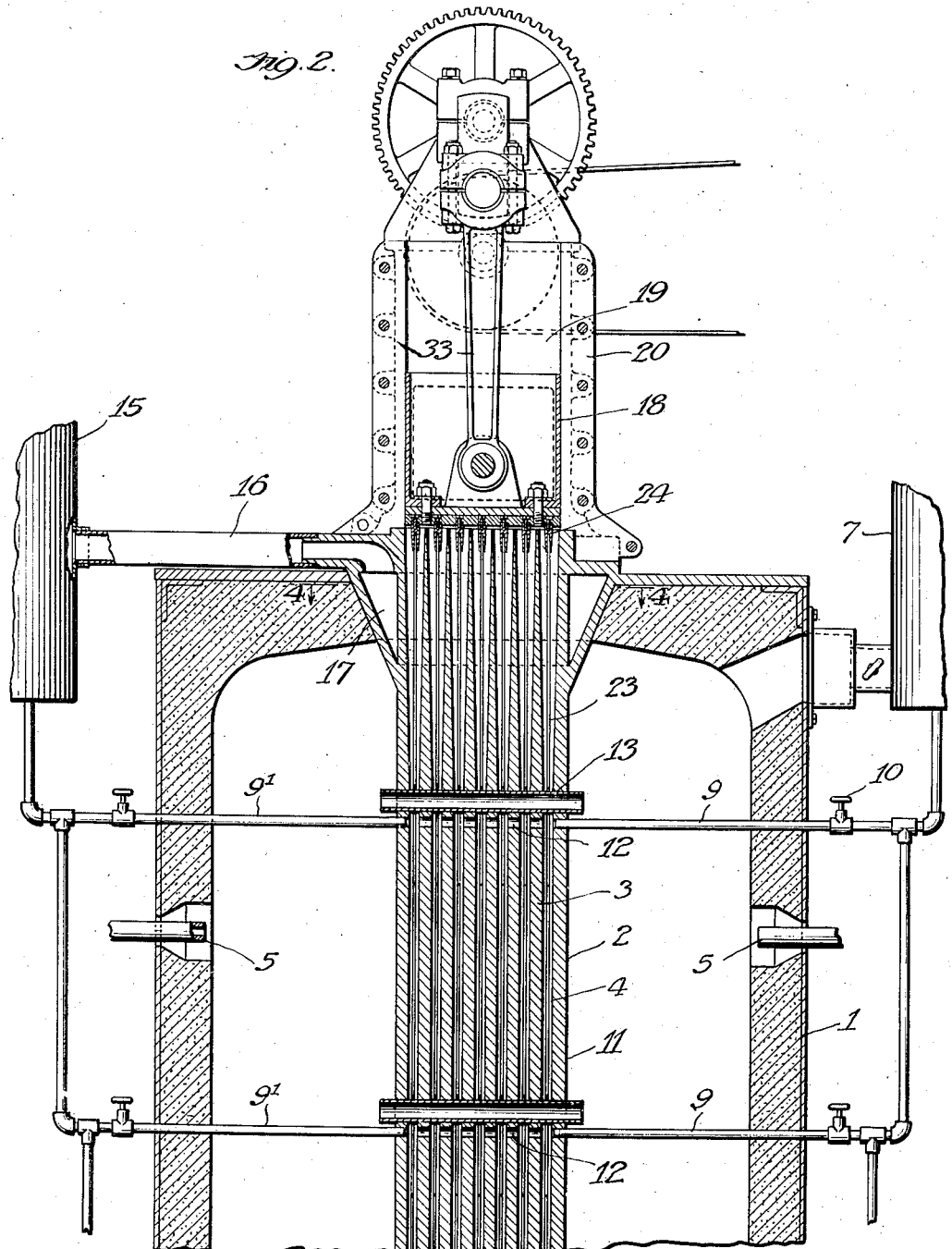

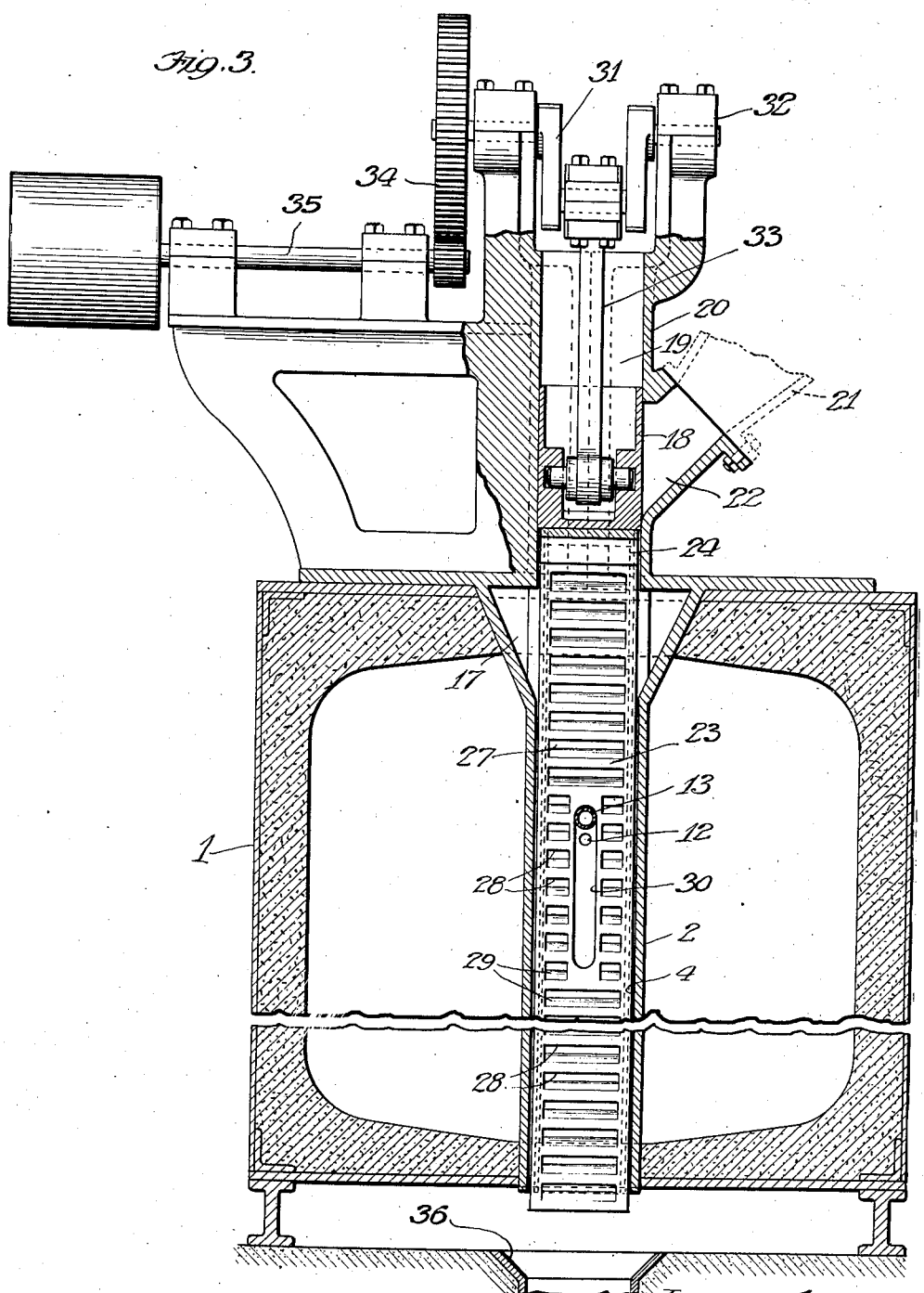

July 15, 1930.   J. J. BERRIGAN ET AL   1,770,727
DRYING APPARATUS AND PROCESS OF DRYING
Filed May 9, 1928    4 Sheets-Sheet 4
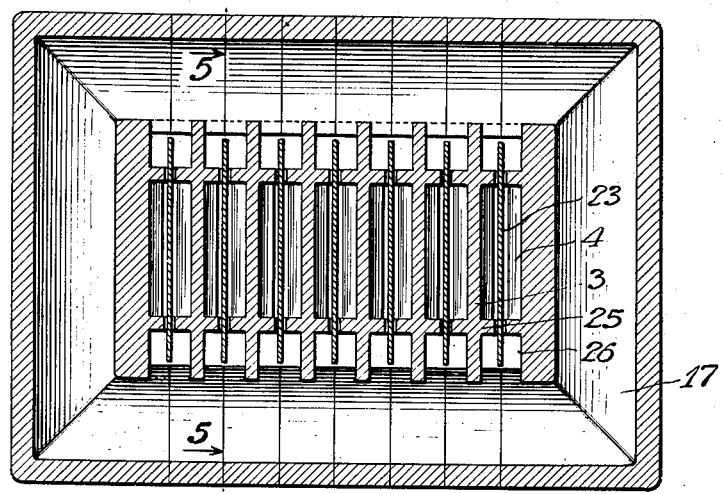
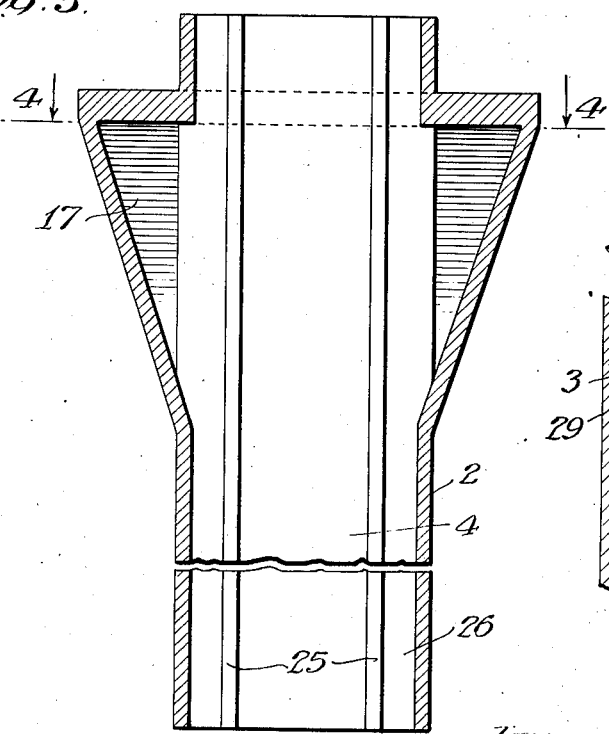
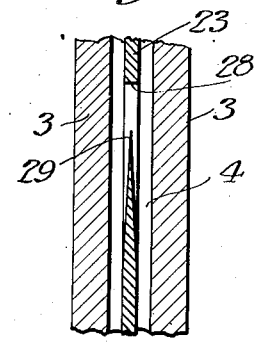

Patented July 15, 1930

1,770,727

UNITED STATES PATENT OFFICE

JOHN J. BERRIGAN AND JOHN B. BERRIGAN, OF MILWAUKEE, WISCONSIN, ASSIGNORS OF ONE-THIRD TO KATHERYNE P. MALON, OF MILWAUKEE, WISCONSIN; SAID JOHN B. BERRIGAN ADMINISTRATOR OF SAID JOHN J. BERRIGAN, DECEASED

DRYING APPARATUS AND PROCESS OF DRYING

Application filed May 9, 1928. Serial No. 276,420.

This invention relates to an apparatus and a method for drying and pulverizing plastic material such as clayey substances, particularly the activated sludge from sewage disposal plants.

The purposes of the invention include the object of overcoming objections to costly and slow methods now available for rendering activated sludge, from filtering presses, into the dry and pulverized condition required for marketing as a fertilizer. Another object of the invention is to increase the rapidity of drying and pulverizing processes for treatment of plastic material by simultaneously compressing or squeezing water out of the material, drawing it over highly heated surfaces, and subjecting it to the action of hot air or other moisture removing medium. It is also an object of the invention to avoid bringing the material treated into direct contact with flame. A further object of the invention is to rapidly raise the temperature of the substance treated both by mechanical pressure and by causing it to rapidly pass over incandescent surfaces of large area, so that the water content is instantly converted into steam, thus vastly increasing the pressure and disintegrating the material as the steam forces its way outwardly.

Apparatus for carrying out the invention is illustrated in the accompanying drawing in which:

Figure 1 is a plan view of the machine.

Fig. 2 is a vertical section partly broken away, taken on the line 2—2 of Fig. 1.

Fig. 3 is a vertical sectional view partly broken away and taken on the line 3—3 of Fig. 1.

Fig. 4 is an enlarged sectional detail in plan taken on the line 4—4 of Fig. 2, and shows the construction of the drying unit through which the material is fed during the process of treatment.

Fig. 5 is a detail partly broken away and in vertical section taken on the line 5—5 of Fig. 4.

Fig. 6 is an enlarged sectional detail of a material feeding blade and partition walls forming a passage through which the material treated is fed.

The invention broadly considered, consists in the provision of a plurality of narrow passageways, the walls of which are of large area and highly heated. Means are provided for forcing the sludge or material treated through these passageways. Heated air is applied and outlets are provided for the air and also for the steam generated in the material. The means for forcing the material through the passageways comprises reciprocating blades which extend the full length of the passageways and work the material through by a grinding and rubbing action along the heated surfaces. The latter are maintained at the highest temperature near the entrance end in order to promptly surface-dry the material as it is being torn apart or shredded by the blades. Toward the outlet end the temperature is decreased, so that the material treated, as it becomes dried, is not burned.

Referring to the drawings, the walls of the furnace structure are indicated at 1 and enclosed, spaced inwardly from the walls, a drying compartment or unit 2 extending from the top to the bottom of the furnace and composed of a plurality of metallic partitions 3 to provide narrow passageways 4 for material which is to be treated. The furnace is preferably a gas or oil burner so that the temperature of the unit 2 may be regulated as desired and maintained at a higher temperature towards its upper or entrance end than at its lower or discharge end. Oil burner nozzles are indicated at 5 near the upper end of the furnace. The passageways 4 are supplied with a moisture removing medium such as air under pressure and preferably heated. The air may be heated by coils 6 located in the outlet flue 7 for gases of combustion. Air from a compresser not shown is carried to coil 6 through the conduit 8 and from the coil 6 the air is delivered by the conduits 9 to the drying unit 2. The conduits 9 are each controlled by a valve 10. Air from these conduits enters the unit 2 at the passageway 4 nearest the end wall 11 of the drying unit and from this passageway works its way to the remaining passageways 4 through the apertures 12 in the partition walls 3. The air is preferably under high pressure so as to freely work into the material treated which is also under pressure but the space in the passageways 4 adjacent the apertures 12 is kept partly open by transverse conduits 13 extending through the unit 2 slightly above the apertures 12 and tubes 13 assist in keeping the interior of the unit 2 highly heated as they are open to the combustion chamber.

Heated air may also be delivered to the unit 2 in a similar manner through the conduits 9' which communicate with the heating coil 14 in an air and steam outlet flue 15 which carries away the vapor driven from the material treated by communicating with a transverse flue 16 which, through the passageway 17 formed around the unit 2, communicates with each of the narrow vertical passageways 4.

The material to be treated is forced into the passageways 4 at the upper end by means of a rectangular piston 18 which is reciprocated in the piston chamber 19 formed by the casting 20 mounted on the top of the furnace. The material is delivered to the piston chamber 19 through the hopper 21 when the piston is at the upper end of its stroke and is forced by the piston under high pressure into the passageways 4. The piston acts as a valve to shut off communication with the hopper 21 when at the lower part of its stroke as indicated in Figs. 2 and 3 by closing the inlet 22 (Fig. 3). The material treated is worked downwardly through the passageways 4 by blades 23 which reciprocate with the piston 18 and are secured thereto by fastening means 24. The blades 23 are guided by shoulders 25 on the partition walls 3. These shoulders extend from end to end of the partition walls and separate the passageways 4 from the passageways 26 which serve to carry the used air and vapor upwardly to the passageway 17 communicating with the outlet flue 16. The air and vapor or steam passes out of the passageways 4 to the passageways 26 between the blades 23 and the shoulders 25. The blades 23 are provided with a series of openings 27 which openings are bounded on their upper sides with the flat edges 28 of the blades (Fig. 6) and at the bottom by sharpened edges 29. The flat edges 28 on the down stroke of the blades serve to drag the material downwardly and on the return stroke the sharpened edges 29 cut through the material, offering less resistance and therefore the material is fed progressively downward. The blades are also provided with elongated slots 30 to provide space without interference for the transverse combustion tubes 13.

The piston and the blades attached thereto are reciprocated by crank 31 mounted in the bearings 32 at the top of the machine and connected to the piston by connecting rod 33. The crank is driven through the gears 34 connecting it with the pulley shaft 35. The stroke of the piston is such that after it has closed the inlet 22 (Fig. 3) it continues to move downwardly two or more inches for the purpose of highly compressing the material treated into the passageways 4. The reciprocation of the blades serves to work the material downwardly rubbing and rolling it over the highly heated surfaces of the partition walls 3. It is finally discharged in a dry state into hopper 36 below the floor of the furnace.

In the operation of the device, the wet material which is to be dried is continuously fed into the hopper 21 and falls below the piston 18 when at the upper part of its stroke. At each stroke the piston cuts off a portion of the material and forces it into the passage ways 4 where it is acted upon by the reciprocating blades 23 and rapidly worked downwardly first over red hot surfaces of partition walls 3, then along areas of these walls which are of decreasing temperature toward the bottom. The heated surfaces of the partition walls serve to first surface-dry the material as it is being pulverized by the rubbing action of the blades. These plates 23 are kept hot by conduction from their exposed lateral edges as will be apparent from Fig. 4. As these plates move up and down, they reciprocate relative to and rub against the material to be dried, as the latter is fed gradually downward by comparatively short steps, consistent with the small intake for each depression of the piston. The steam generated increases the pressure. The heated air delivered through the conduits 9 is also preferably under considerable pressure and escapes with the steam upwardly through passageways 26.

The burner nozzles are located near the upper end of the furnace in order to quickly apply a high temperature to the wet material as it is received. As the material becomes drier it is subjected to less temperature at the lower part of the furnace. In treating sludge, the machine is preferably operated at a rapidity which will insure the passage of the sludge from the top to the bottom of the unit 4 within from five to ten seconds.

Although but one specific embodiment of this invention has been herein shown and described, it will be understood that numerous details of the construction shown may be altered or omitted without departing from the spirit of this invention as defined by the following claims.

We claim:

1. The process of drying and pulverizing plastic material which consists in rubbing the material in a thin layer by a relative reciprocating motion under pressure over a highly heated surface and simultaneously subjecting the material to a current of moisture removing medium.

2. The process of drying and pulverizing plastic material which consists in injecting a heated moisture removing medium into said material and forcing the material in a thin layer under pressure over a highly heated surface.

3. The process of drying plastic material which consists in compressing and dragging the material over a highly heated surface, and forcing a moisture removing medium therethrough.

4. The process of drying plastic material which consists in dividing the material into a plurality of thin layers, injecting a heated moisture removing medium therein, and forcing said layers under pressure over highly heated surfaces.

Signed at Chicago this 7th day of May, 1928.

JOHN J. BERRIGAN.
JOHN B. BERRIGAN.